(12) United States Patent
Mansur et al.

(10) Patent No.: US 10,378,903 B2
(45) Date of Patent: Aug. 13, 2019

(54) AUTOMATIC MODE CONTROL FOR A PARACHUTIST NAVIGATION SYSTEM

(71) Applicant: The Charles Stark Draper Laboratory, Inc., Cambridge, MA (US)

(72) Inventors: Sabrina M. Mansur, Somerville, MA (US); Trevor C. Savage, Cambridge, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 11 days.

(21) Appl. No.: 15/417,798

(22) Filed: Jan. 27, 2017

(65) Prior Publication Data

US 2018/0216939 A1 Aug. 2, 2018

(51) Int. Cl.
*G01C 21/20* (2006.01)
*B64D 17/00* (2006.01)
*G01S 19/19* (2010.01)
*G01S 19/20* (2010.01)
*G01S 19/39* (2010.01)
*G01C 23/00* (2006.01)

(52) U.S. Cl.
CPC ............ *G01C 21/20* (2013.01); *B64D 17/00* (2013.01); *G01S 19/19* (2013.01); *G01S 19/20* (2013.01); *G01S 19/39* (2013.01); *G01C 23/00* (2013.01)

(58) Field of Classification Search
CPC ......... G01C 21/20; G01C 23/00; G01S 19/20; G01S 19/19; G01S 19/39; B64D 17/00
See application file for complete search history.

(56) References Cited

U.S. PATENT DOCUMENTS

| 5,638,059 A * | 6/1997 | Pilkington | G01C 5/06 116/268 |
|---|---|---|---|
| 5,671,162 A * | 9/1997 | Werbin | G01C 5/06 702/130 |
| 5,798,733 A * | 8/1998 | Ethridge | G01C 21/20 342/357.34 |
| 6,378,808 B1 * | 4/2002 | Smolders | B64C 27/33 244/147 |
| 6,934,633 B1 * | 8/2005 | Gallagher | G01C 21/00 342/357.52 |
| 7,073,752 B2 * | 7/2006 | Voronka | B64D 17/56 244/149 |
| 2004/0245398 A1 * | 12/2004 | Weis | B64D 17/60 244/149 |

(Continued)

*Primary Examiner* — Courtney D Heinle
(74) *Attorney, Agent, or Firm* — Hamilton, Brook, Smith & Reynolsd, P.C.

(57) ABSTRACT

A method of identifying operational modes experienced by a user during a jump from an aircraft may comprise estimating a user altitude and a user descent rate, based on a set of navigation state data vectors. The method may further comprise determining that the user is ready to transition from a flight mode to a descent mode when the user altitude is above a jump altitude threshold, and a variation of the user altitude is below a predetermined altitude variation threshold. After determining that the user is ready to transition from the flight mode to the descent mode, the method further comprises determining that the user has transitioned from a flight mode to a descent mode when a user ground speed is below a ground speed threshold, and one or both of (i) a GNSS position error estimate, and (ii) the user descent rate estimate, indicates a jump signature.

12 Claims, 10 Drawing Sheets (56) References Cited

U.S. PATENT DOCUMENTS

| | | | | |
|---|---|---|---|---|
| 2005/0001089 A1* | 1/2005 | Rossy | ................ | B64C 3/30 |
| | | | | 244/4 A |
| 2006/0271249 A1* | 11/2006 | Testrake | ............... | G09B 9/08 |
| | | | | 701/3 |
| 2007/0233382 A1* | 10/2007 | Preston | ............... | G01C 21/20 |
| | | | | 701/500 |
| 2008/0054125 A1* | 3/2008 | Goorts | ............... | B64D 17/56 |
| | | | | 244/149 |
| 2010/0204910 A1* | 8/2010 | Durrett | ............... | G01C 21/20 |
| | | | | 701/532 |
| 2011/0106449 A1* | 5/2011 | Chowdhary | ......... | G01C 21/005 |
| | | | | 701/472 |
| 2011/0185479 A1* | 8/2011 | Ohno | ............... | A42B 3/04 |
| | | | | 2/410 |
| 2011/0224849 A1* | 9/2011 | Braly | ............... | G05D 1/0061 |
| | | | | 701/9 |
| 2012/0153088 A1* | 6/2012 | Lokeberg | ............ | B64D 17/00 |
| | | | | 244/4 A |
| 2016/0117930 A1* | 4/2016 | Eaton, Jr. | ............ | G08G 5/0039 |
| | | | | 701/14 |
| 2016/0131485 A1* | 5/2016 | Coatantiec | ............ | G01C 21/20 |
| | | | | 701/512 |
| 2016/0297520 A1* | 10/2016 | Sada-Salinas | ...... | B64C 29/0025 |
| 2018/0050805 A1* | 2/2018 | Kalinka | ............... | B64D 17/72 |

* cited by examiner

FIG. 10

AUTOMATIC MODE CONTROL FOR A PARACHUTIST NAVIGATION SYSTEM

This invention was made with government support under FA4600-06-D0003 awarded by the U.S. Department of Defense. The government has certain rights in the invention.

BACKGROUND

Military parachutists and other skydivers may use handheld or wearable navigation systems to plan their missions and navigate to their destinations. Such navigation systems have certain operating modes designed to assist mission planning while a user is in an aircraft on the way to a jump point (e.g., the "aircraft modes"), and other operating modes to assist navigation after the user has jumped from the aircraft (e.g., the "descent modes" and the "ground modes").

Informational needs of the user change significantly at the moment of the jump (i.e., the jump transition). Before the jump, the user needs information for determining the location of a high altitude release point (the "HARP" or "jump point"), the time when the HARP is approached, and the time when the HARP is reached. After the jump, while the user is in freefall or on canopy, the user requires real-time location, ground speed, wind speed and direction, and other informational aids for navigation and situational awareness.

The jump transition also coincides with a peak in the physical and cognitive workload of the user, who at that time is occupied with stabilizing freefall, and deploying and establishing control of the parachute canopy. Because the user is so busy during the jump transition, it is undesirable for the navigation system to add to the user's workload.

SUMMARY OF THE INVENTION

The described embodiments provide a level of automated control of the user's navigation system during a jump transition, which may reduce the user's workload during a jump event. In particular, the described embodiments may provide a system for and method of controlling the navigation system mode without user input, in response to situational information (e.g., GNSS navigation inputs) that indicate a jump transition.

In one aspect, the invention is a method of identifying operational modes experienced by a user during a jump from an aircraft, comprising estimating a user altitude and a user descent rate, based on a set of navigation state data vectors sampled according to a sampling interval. The method further comprises determining that the user is ready to transition from a flight mode to a descent mode when the user altitude is above a jump altitude threshold, and a variation of the user altitude is below a predetermined altitude variation threshold. After determining that the user is ready to transition from the flight mode to the descent mode, the method further comprises determining that the user has transitioned from a flight mode to a descent mode when a user ground speed is below a ground speed threshold, and one or both of (i) a GNSS position error estimate, and (ii) the user descent rate estimate, indicates a jump signature.

In embodiments, the set of samples of navigation data comprises one or more of current raw altitude, ground speed measurements and GNSS position error estimate. Estimating a user altitude may comprise applying a Kalman filter to a set of samples of the current raw altitude. Estimating a user descent rate may comprise applying a Kalman filter to a set of user altitude changes. Each user altitude change is a change measured between consecutive raw altitude samples.

In embodiments, determining the variation of the user altitude may comprise determining a difference between (i) a current filtered altitude, and (ii) a minimum filtered altitude observed during a leveling test duration. Determining the variation of the user altitude may comprise first determining that the user altitude is above the jump altitude threshold, then determining that an absolute value of a difference between (i) a current filtered altitude and (ii) a greatest filtered altitude measured during a leveling test duration.

Determining the user ground speed may comprise calculating a ground distance Dg between consecutive position measurements from the set of navigational state data, and calculating a ratio of (Dg)/(sampling interval), where the sampling interval represents the time between measurements of the navigational state data.

The GNSS position error estimate may indicate the jump signature when a first set of samples of the GNSS position error estimate exhibits a higher GNSS position error than a second set of samples of the GNSS position error estimate, where the first set of samples occurs later in time than the second set of samples.

The GNSS position error estimate may indicate the jump signature when one or more samples of a first set of samples of the GNSS position error estimate exceeds a threshold value. The threshold value may be a predetermined value that is provided to the system from an external source, or it may be determined by the system based on parameters available to the system. For example, the method may further include calculating the threshold value as a function of a second set of samples of the GNSS position error estimate, where the first set of samples occurs later in time than the second set of samples.

In embodiments, the user descent rate estimate may indicate the jump signature when each of a set of consecutive user descent rate estimate samples exceeds a descent rate threshold.

The method may further include indicating that the user has transitioned from a descent mode to a landed mode when the user altitude is below a landed mode altitude threshold, a user ground speed is below a landed ground speed threshold, and one or both of (i) a GNSS position error estimate, and (ii) the user descent rate, indicates the landed mode signature.

In another aspect, the invention is a mode identifying device configured to determine and report operational modes experienced by a user during a jump from an aircraft, comprising a navigation system interface configured to receive navigation state information and to provide operational mode information, and a jump determination module configured to determine that the user has transitioned from a flight mode to a descent mode when the user altitude is above an altitude threshold, a variation of the user altitude is below a predetermined altitude variation threshold, the user ground speed is below a ground speed threshold, and one or both of (i) a GNSS position error estimate, and (ii) the user descent rate, indicates the jump signature.

Embodiments may further include a processor and a memory with computer code instructions stored thereon, the memory operatively coupled to the processor such that, when executed by the processor, the computer code instructions cause the system to implement the jump determination module. The navigation system interface may provide the operational mode information, produced by the jump determination module, to a navigation system. The navigation system may be implemented by an application executing on a mobile computing device.

In embodiments, the navigation system may change a state of the user's operational mode to descent mode in response to the operational mode information indicating a transition to descent mode. The navigation system may generate situational awareness information as a function of the operational mode information, and cause the situational awareness information to be displayed on a display device. The operational mode information may indicate a transition from aircraft mode to descent mode. The operational mode information may indicate a transition of the user's operational mode from descent mode to ground mode.

In another aspect, the invention is a method of identifying operational modes experienced by a user during a jump from an aircraft, comprising estimating a GNSS position error based on a set of navigation state data vectors sampled according to a sampling interval and determining that the user has transitioned from a flight mode to a descent mode when the GNSS position error estimate indicates a jump signature.

c method of identifying operational modes experienced by a user during a jump from an aircraft, comprising estimating a user descent rate based on a set of navigation state data vectors sampled according to a sampling interval and determining that the user has transitioned from a flight mode to a descent mode when the user descent rate estimate indicates a jump signature.

In another aspect, the invention is a method of identifying operational modes experienced by a user during a jump from an aircraft, comprising estimating a user altitude and a user descent rate, based on a set of navigation state data vectors sampled according to a sampling interval, and determining that the user has transitioned from a flight mode to a descent mode when the user altitude is above a jump altitude threshold, a variation of the user altitude is below a predetermined altitude variation threshold, a user ground speed is below a ground speed threshold, and one or both of (i) a GNSS position error estimate, and (ii) the user descent rate estimate, indicates a jump signature.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figure 1:
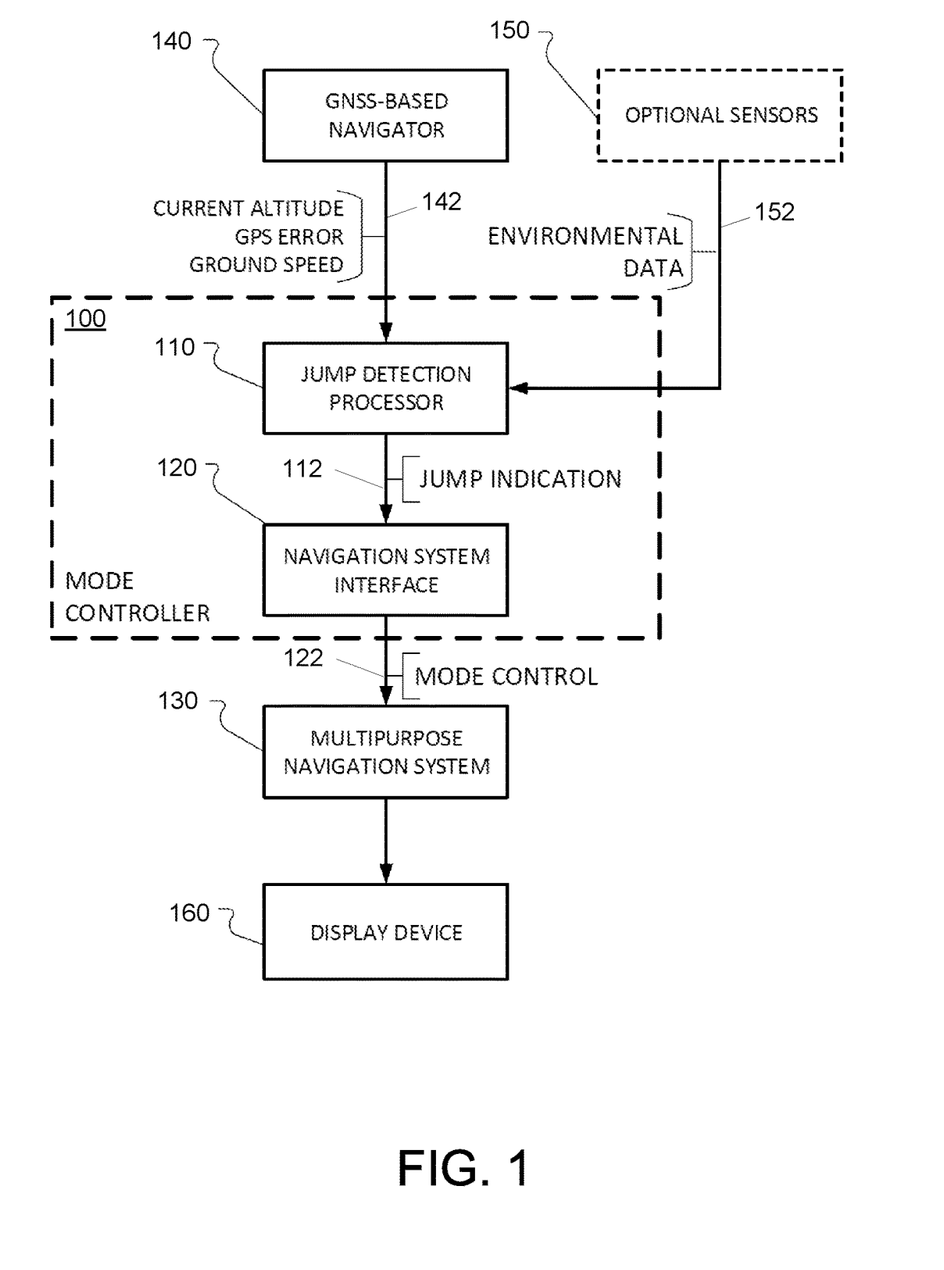
FIG. 1 shows an example embodiment of a mode controller for automatic control of a parachutist navigation system, constructed according to the invention.

FIG. 1 shows an example embodiment of a mode controller 100 for automatic control of a parachutist navigation system. The mode controller 100 comprises a jump determination processor 110 and a navigation system interface 120. The jump determination processor 110 is a processing component that performs automatic determination of state transitions as described below with reference to the example process shown in FIG. 2. The navigation system interface 120 may transform the jump indication information 112 generated by the jump determination processor 110 into a format suitable for use by the associated multipurpose navigation system 130.

Embodiments of the mode controller 100 may provide mode control information 122, concerning the situational state associated with a user (e.g., a parachutist), to the multipurpose navigation system 130. Examples of situational state may include, but are not limited to, aircraft mode, descent mode and ground mode. The multipurpose navigation system 130 may be a mobile navigation system, handheld or wearable, designed to assist military parachutists with mission planning and execution.

In embodiments, the multipurpose navigation system 130 may be an embedded software application running on a mobile operating system of a handheld or wearable device, such as a smartphone or tablet. The device may provide parachutists with improved mission planning capabilities and situational awareness information, such as their current location and ground speed, and wind speed and direction. For example, at least one government-owned geospatial awareness software platform has been developed to provide a multipurpose navigation system 130 that executes on a smartphone running the Android operating system. This platform has been implemented as part of various military and law enforcement situational awareness tools. The multipurpose navigation system 130 may include an integrated Global Navigation Satellite System (GNSS) receiver and processor or may be connected to a separate GNSS module by Bluetooth or other wireless, wired, or optical interface. The separate GNSS module may be a GPS module built into a military tactical radio, or a standalone mobile GPS receiver, such as the Defense Advanced GPS Receiver (DAGR). In embodiments, any of the possible GNSS navigation sources that may be part of the multipurpose navigation system 130 may also serve as the GNSS-based navigator 140.

In some embodiments, the jump determination processor 110 may be a microprocessor, microcontroller, or other processing device that may be part of an embedded system, for example, part of a mobile (e.g., handheld) navigation system (e.g., the multipurpose navigation system 130 or other mobile device). Alternatively, the embedded system may be an aircraft avionics system that communicates with the mobile navigation system 130. In some embodiments, the jump determination processor 110 may comprise computer code instructions, stored on a memory device, which executes on a processor (e.g., a microprocessor, microcontroller or other processing device). The jump determination processor 110 may utilize a stand-alone processor, or may share a processor with an associated device (e.g., the multipurpose navigation system 130 or other mobile device).

The navigation system interface 120 receives a jump indication signal 112 from the jump determination processor 110 and transmits mode control information and/or commands 122 to the multipurpose navigation system 130. In some embodiments, the navigation system interface 120 may comprise electronic circuits, for example, logic circuits, signal conditioning circuits, drivers, transceivers, or a combination of these and other devices, capable of generating mode control commands 122 in response to a jump indication signal 112 and transmitting the commands 122 over a communications channel, for example a cable, optical fiber, printed circuit bus, or wireless communications channel. In other embodiments, the navigation system interface 120 may comprise software executed by an embedded microprocessor or other computer that also hosts the jump determination processor 110 and/or the multipurpose navigation system 130. In other embodiments, the navigation system interface 120 may comprise a combination of electronic circuits and executed software.

In some embodiments, the mode controller 100 may receive navigation state data 142 from a GNSS navigator 140. The navigator 140 may comprise a microelectronic module or chipset that receives GNSS signals, such as Global Positioning System (GPS), GLONASS or Galileo satellite signals, and processes the navigation state data 142 to compute position estimates, velocity estimates, and associated error metrics. In other embodiments, the navigator 140 may further comprise an application programming interface (API; not shown) that processes the output of a GNSS chipset and makes navigation state data available within a mobile operating system. For example, the Android operating system includes a location API that makes navigation state data available to applications running on that operating system. In some embodiments, the navigator 140 may be implemented in a software application executed on a mobile operating system. For example, the navigator 140 may be a feature of the multipurpose navigation system 130.

The navigation state data 142 includes at least positional data (including a current value of altitude), an estimate of the positional error of the GNSS navigation solution, and an estimate of speed relative to the ground. The positional data represents the location of the multipurpose navigation system 130, which typically is part of a device attached to a user during a jump, so that it also represents the location of the user. For example, the altitude may be the altitude of the user above a World Geodetic System ellipsoid used by the GNSS to model sea level throughout the world. The GNSS error estimate may be a root-mean-square error in the three-dimensional position of the user, although other techniques for determining a measure of error may also be used. The ground speed may be the magnitude of the horizontal component of the user's velocity relative to the earth's surface. Other forms of the navigational state data 142 may alternatively be used.

The mode controller 100 may receive environmental data 152 from one or more sensors 150, for example, a barometric pressure sensor, electronic compass, barometric or radar altimeter, airspeed indicator, or other altitude or speed sensor known in the art. In embodiments, the jump determination processor 110 may process the sensor data 152 to obtain supplementary navigation information, for example, pressure altitude, user ground speed, or user orientation information. The jump determination processor 110 may use the supplementary navigation information to improve the jump indication and augment or replace the navigation state data it receives from the GNSS-based navigator 140, which may be advantageous if the GNSS signals are degraded or unavailable.

The display device 160 may be part of the user interface of the multipurpose navigation system 130. In embodiments, the display device 160 displays situational awareness information that is tailored to the operating mode of the multipurpose navigation system 130. For example, while the system 130 is in aircraft mode, the display device 160 may indicate the estimated time remaining until the user arrives at the high altitude release point. In descent mode, the display device 160 may display an estimated trajectory to the landing zone, along with the locations of fellow parachutists. In embodiments, mode control commands 122 from the mode controller 100 may change the display device from aircraft mode to descent mode within a few seconds of the jump indication. The mode control commands are in a format compatible with the multipurpose navigation system 130.

Figure 2:
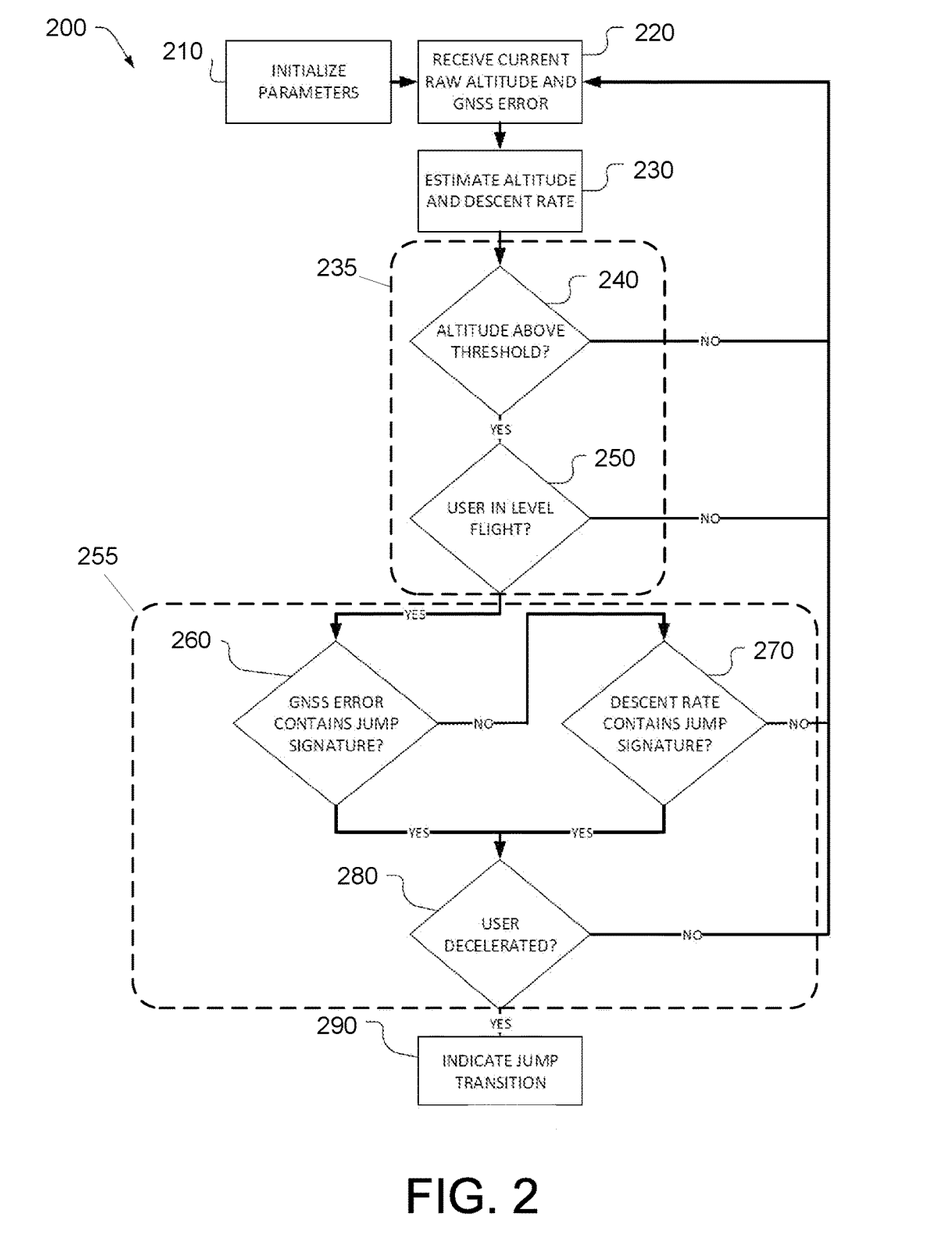
FIG. 2 presents a flowchart of an example arrangement of operations of the jump determination processor according to the invention.

FIG. 2 presents a flowchart of an example arrangement of operations 200 of the jump determination processor 110. The operations may be performed, for example, by one or more embedded microprocessors contained in a handheld device upon which the mode controller 100 and the multipurpose navigation system 130 reside. Or, for example, the operations may be performed by a state machine implemented by a microcontroller or application specific integrated circuit (ASIC).

Operations 200 may comprise initializing 210 the configurable parameters used to determine if a jump transition has occurred. Initial values for the parameters may be adjusted according to the aircraft characteristics, flight path, user, mission, and other characteristics of a type or category of parachute jumps, to improve the accuracy of the jump indication. Exemplary parameters may include the GNSS error history length, which is the number of samples of a sequence of GNSS error estimates that are processed to determine if a signature of a jump transition exists, and which may be retained in memory for purposes of the jump transition analysis. The parameters may also include an altitude threshold below which a jump should not be attempted, and a ground speed threshold, above which a user would not be traveling after leaving the aircraft (due to atmospheric drag deceleration). Other parameters may include a descent rate threshold, a leveling altitude variation threshold, and a leveling test duration. The aircraft (and thus the on-board user) may be considered to be in a state of level flight, necessary for a parachute jump, if the user's altitude variation over the leveling test duration is less than the leveling altitude variation threshold.

After the configurable parameters are initialized 210, operations may further comprise receiving 220 navigation state data, including at least current raw altitude and ground speed measurements, and an estimate of GNSS position error, from the GNSS source (e.g., the GNSS-based navigator 140). In embodiments, the navigator 140 may provide measurements and error estimates once per second, but other update rates may be used. After the navigation state data is received 220, operations may further include estimating 230 user altitude and descent rate, for example on the basis of a time sequence of navigation state data. The estimation 230 may employ a Kalman filter or other stochastic estimation technique. Outputs of estimating 230 user altitude and descent rate may comprise filtered altitude and filtered descent rate.

After user altitude and descent rate are estimated 230, operations may further comprise determining 235 if the user is ready to transition from flight mode to descent mode (also referred to herein as a jump transition), which includes determining 240 if the filtered altitude is above a jump altitude threshold, and determining 250 if the user is in level flight. Being above a minimum jump altitude and being in level flight are events that should occur prior to a transition from flight mode to jump mode, so the events are treated in the arrangement of operations 200 as a prerequisite to determining that a transition from flight mode to jump mode. Further, since the user will no longer be in level flight once the transition from flight mode to jump mode has occurred, the level flight mode determination 250 could not be meaningfully accomplished after the jump has occurred.

One step of determining 235 if the user is ready to transition from flight mode to descent mode may comprise determining 240 if the filtered altitude is above a jump altitude threshold. The jump altitude threshold may be one of the configurable parameters initialized in step 210. In an example embodiment, the jump altitude threshold may be 243.8 m, but greater or lesser values may be also be used. If the filtered altitude is less than or equal to the jump altitude threshold, then the jump determination processor 110 determines that a jump has not occurred, and the next operation is to receive 220 another sample of the navigation state. If the filtered altitude is determined to be greater than the jump altitude threshold, then the next operation is to determine 250 if the user has been in approximately level flight during an immediately preceding period.

Figure 3:
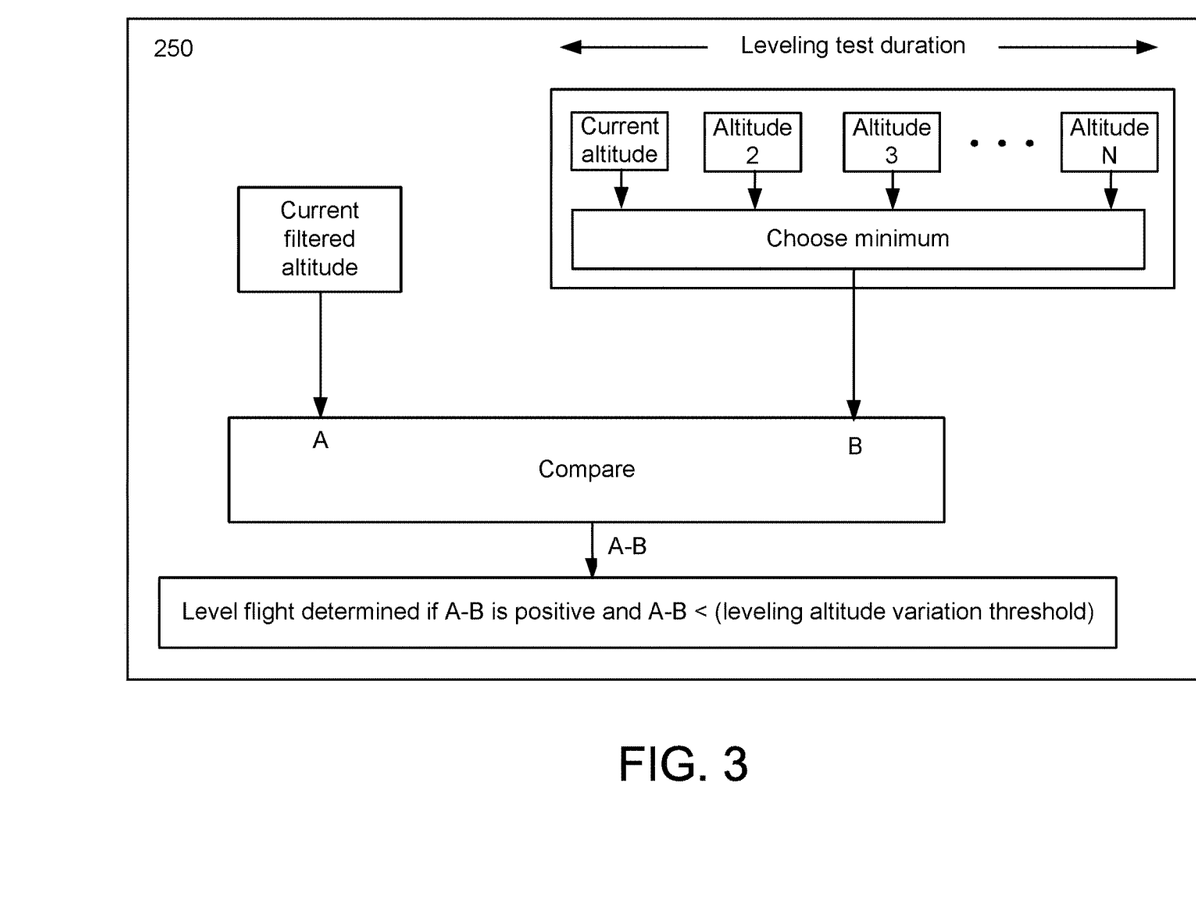
FIG. 3 shows an example procedure for determining if the user has been in level flight according to the operations of FIG. 2.

An example procedure for determining 250 if the user has been in level flight is shown in FIG. 3, which compares the current filtered altitude to a minimum filtered altitude observed during an interval equal to the leveling test duration, ending at the current time. If the current filtered altitude exceeds the minimum filtered altitude (i.e., A-B is positive) and current filtered altitude exceeds the minimum filtered altitude by less than the leveling altitude variation threshold, then level flight is determined.

In other embodiments, level flight may be determined 250 if the absolute value of the difference between the current filtered altitude and any filtered altitude observed during the leveling test duration does not exceed the leveling altitude variation threshold. Other techniques known in the art for determining level flight may alternatively be used.

Example values of the leveling test duration and the leveling altitude variation threshold may be 90.0 s and 76.2 m, respectively, but greater or lesser values of each of those parameters may be alternatively be used.

The user not being in level flight may indicate that the aircraft is climbing or maneuvering, meaning that a jump has not occurred. If it is determined 250 that the user is not in level flight, the next operation is to receive 220 another sample of the navigation state. If it is determined 250 that the user has been in approximately level flight the next operation is to determine 255 if a transition from flight mode to descent mode has occurred.

For the operation of determining 235 if the user is ready to transition from flight mode to descent mode, the example shown in FIG. 2 depicts the step of determining 240 if the filtered altitude is above a jump altitude threshold as occurring prior to the step of determining 250 if the user is in level flight, although in other embodiments, the order of steps 240 and 250 may be reversed or may occur simultaneously.

Determining 255 if a transition from flight mode to descent mode has occurred includes one or more of the steps of (i) determining 260 that a sequence of GNSS error estimates contains a signature of a jump transition, (ii) determining 270 that the sequence of filtered descent rates contains a signature of a jump transition, and (iii) determining 280 that the user has decelerated.

In the example embodiment shown in FIG. 2, operation of determining if a transition from flight mode to descent mode has occurred first determines 260 if a sequence of GNSS error estimates contains a jump signature, then only determines 270 if the user descent rate contains a jump signature if the GNSS error estimates does not contain a jump signature. If either the GNSS error estimates or the user descent rate contains a jump signature, the flight mode to descent mode determination then determines 280 if the user has decelerated. It should be understood, however, that the determining steps 260, 270 and 280 may occur in alternative orders, or the determining steps 260, 270 and 280 may occur simultaneously.

Figure 4:
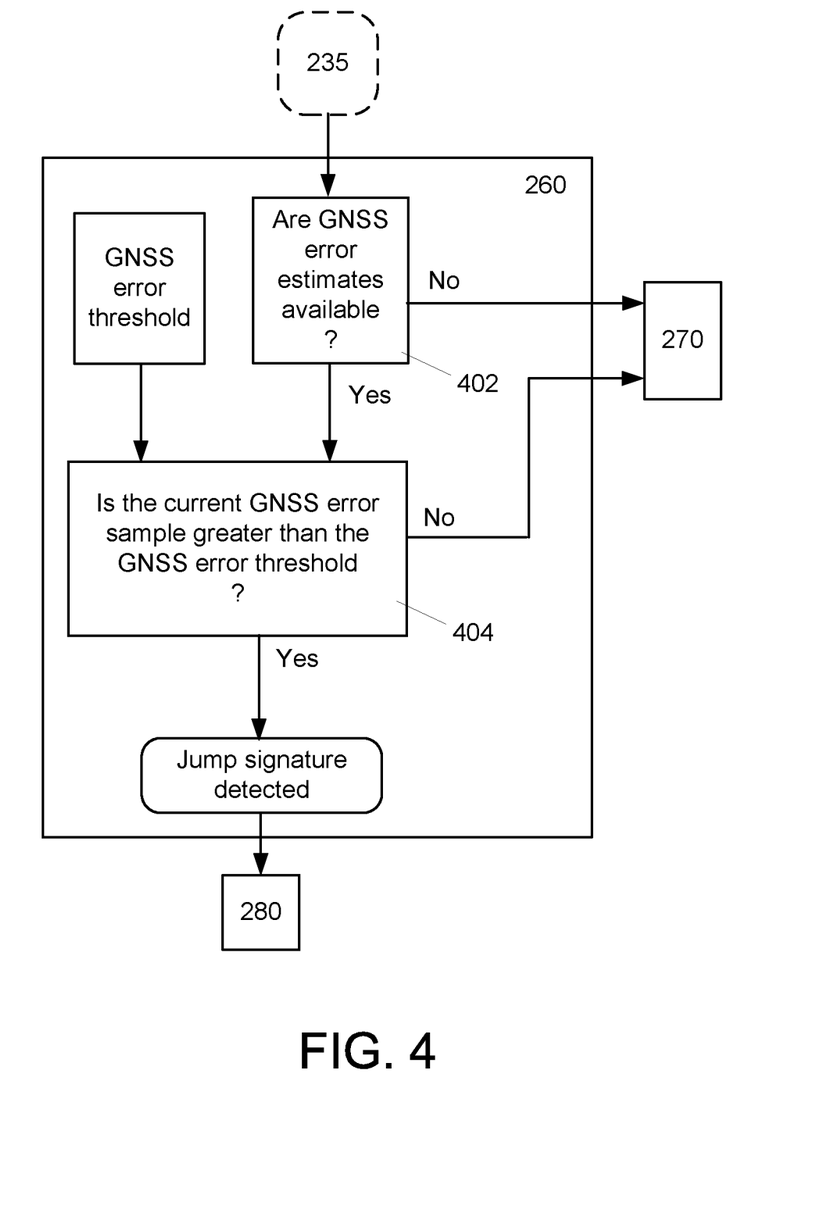
FIG. 4 shows an example procedure for determining a jump signature in a sequence of GNSS error estimates.

An example procedure for determining 260 a jump signature in a sequence of GNSS error estimates, as depicted in FIG. 4, may include determining 402 if GNSS error estimates are available from, for example, the navigator 140. If GNSS error estimates are not available, then no jump signature based on GNSS error estimates is determined to be present, and the next operation may be to determine 270 that the sequence of filtered descent rates contains a signature of a jump transition. If GNSS error estimates are available, then operations may include further processing of the sequence of GNSS error estimates.

The sequence of GNSS error estimates contains relevant signatures because a jump transition may affect the performance of the GNSS-based navigator 140. For example, the sudden change in user velocity upon exiting the aircraft causes a step increase in the GNSS receiver tracking errors, which the receiver may typically reduce over a period of tens of seconds. In addition, as the user and the departing aircraft move apart, the GNSS signals reflected to the receiver by the aircraft change rapidly, which may cause an increase in GNSS position errors due to multipath interference. Changes in the user and receiver orientation during the jump transition can obscure the signal from one or more GNSS satellites, also degrading receiver performance. Finally, the GNSS-based navigator 140 may rely on a GNSS repeater while it operates within the aircraft, but upon exiting the aircraft may receive the GNSS signals at reduced signal-to-noise ratio due to changes in satellite visibility, differences in antenna gain, and other effects. Individually and in combination, these effects may produce a temporary increase in GNSS error estimates during the jump transition, creating a signature that the described embodiments may exploit as an input in the determination of the jump transition.

Further processing of the sequence of GNSS error estimates to determine 260 that a jump signature is indicated may include comparing 404 the current value of the GNSS error to a GNSS error threshold that is a function of any GNSS error samples within the GNSS error history length. In embodiments, the threshold may be a multiple, or other function, of a mode, arithmetic mean, or other statistical measure of the GNSS error samples. In an example embodiment, the threshold may be four times the mode of the GNSS error samples within the GNSS error history length immediately preceding the current time.

If the comparison 404 determines that the current GNSS error is less than or equal to the GNSS error threshold, then no jump signature has occurred, and the next operation may be to determine 270 if the sequence of filtered descent rates contains a signature of a jump transition. If the current GNSS error is greater than the threshold, then a jump signature is indicated, and the next operation may be to determine 280 if the user has decelerated.

Figure 5:
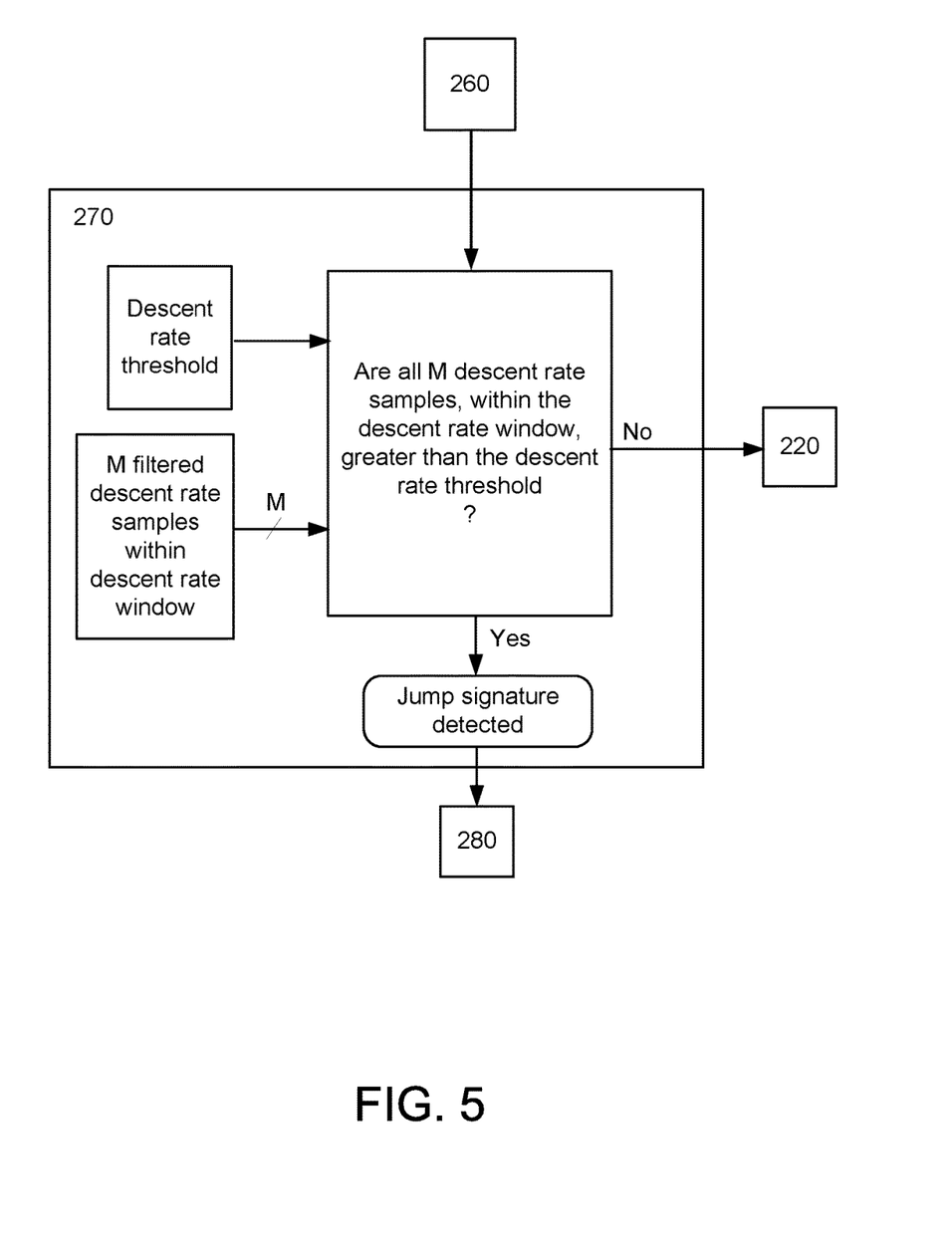
FIG. 5 shows an example procedure for determining if the sequence of filtered descent rates contains a signature of a jump transition.

An example procedure, shown in FIG. 5, for determining 270 if the sequence of filtered descent rates contains a signature of a jump transition may be to compare the descent rate threshold to a sequence of filtered descent rates observed in a period ending at the current time. For example, if the current and the preceding three samples of the filtered descent rate are greater than an example descent rate threshold of 2.44 m/s, then a jump signature may be indicated. A different sample window and threshold may alternatively be used, depending on specific characteristics of the user or the parachute equipment. In the present example, if any one of the current and the preceding three samples of the filtered descent rate are less than or equal to 2.44 m/s, then the filtered descent rate contains no jump signature, and the next operation is to receive 220 another sample of the navigation state. If a jump signature is determined 270 to be present in the sequence of filtered descent rates, then the next operation may be to determine 280 that the user has decelerated.

While FIGS. 2, 4 and 5 illustrate the jump determination processor 110 first determining 260 that a jump signature is present in a sequence of GNSS error estimates and then determining 270 that a jump signature is present in a sequence of filtered descent rates, the order of those steps may be reversed, or they may be performed in parallel.

Figure 6:
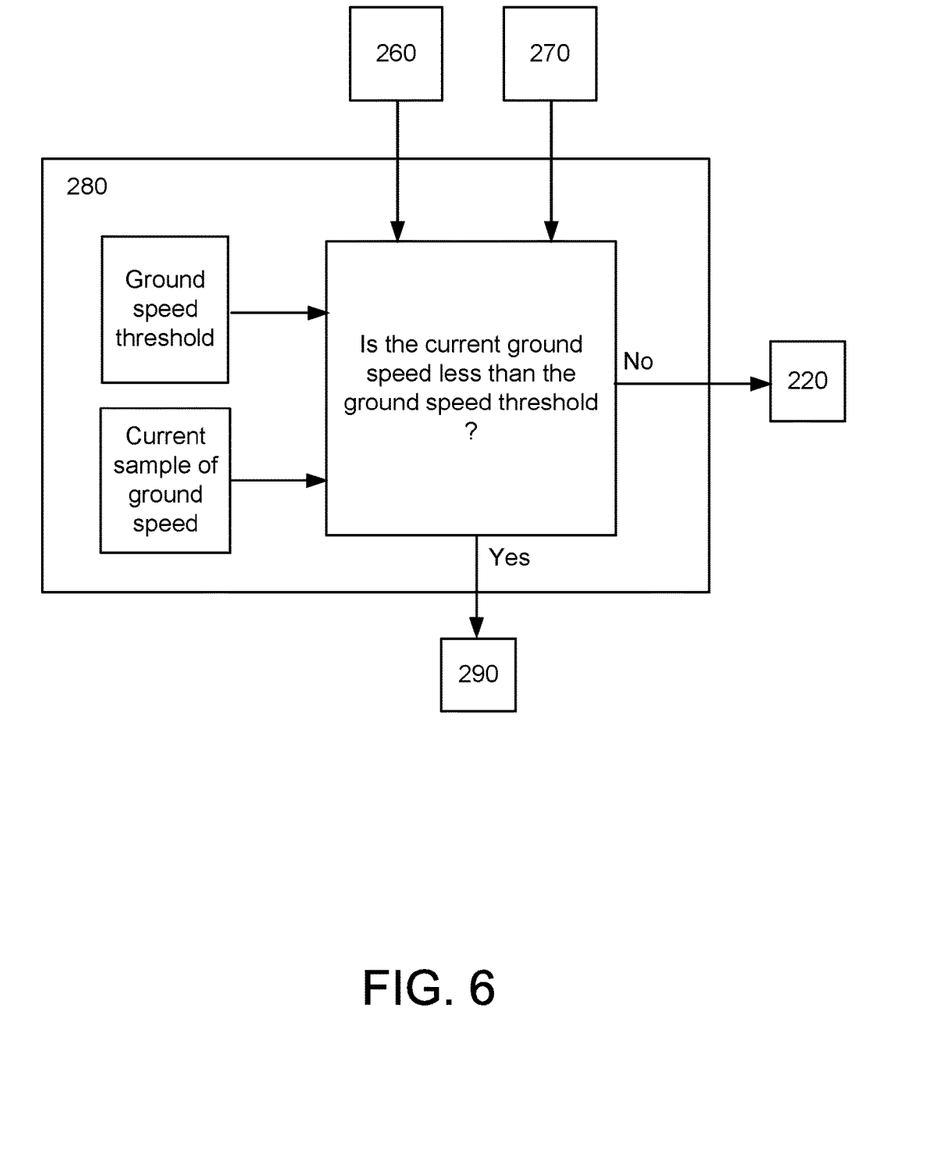
FIG. 6 shows an example procedure for determining that the user has sufficiently decelerated to indicate a jump transition.

An example procedure, shown in FIG. 6, for determining 280 that the user has sufficiently decelerated to indicate a jump transition is to compare the current value of ground speed (i.e., the ground speed from the user's perspective) to a ground speed threshold. In an example embodiment, the ground speed threshold may be 50.0 meters per second, but in other embodiments greater or lesser ground speed threshold values may alternatively be used.

The current user ground speed being greater than or equal to the ground speed threshold indicates that the user has not decelerated and a jump transition has not occurred. If a jump transition is not determined to have occurred, the next operation may be to receive 220 another sample of the navigation state.

The current ground speed being less than the ground speed threshold indicates that the user has decelerated, consistent with a jump transition having occurred. A subsequent operation may therefore include indicating 290 that a jump transition has occurred.

Figure 7:
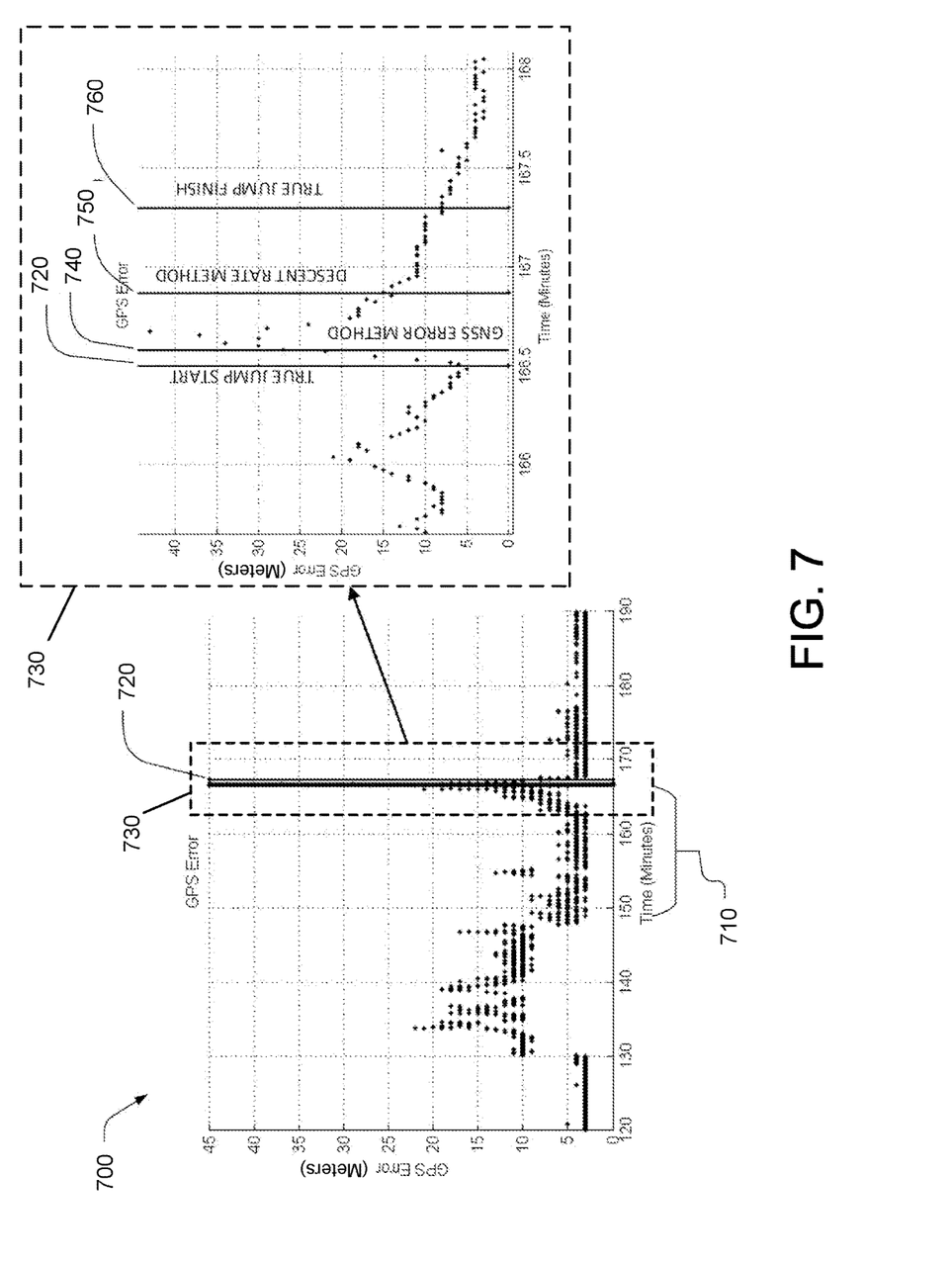
FIG. 7 shows a plot of a sequence of estimates of GNSS error as a function of time during an example parachute jump event.

The graph 700 shown in FIG. 7 plots a sequence of estimates of GNSS error, in meters, as a function of time, in minutes, during an example parachute jump event. FIG. 7 expands a portion 730 of the graph to more clearly illustrate a true (i.e., actual) jump start time 720, a GNSS error process-based jump transition determination time 740 (determined by the GNSS error process 260), a jump transition determination time 750 (determined by the decent rate process 270), and a true (i.e., actual) jump finish time 760. The true start time 720 and true finish time 760 of the jump are based on observations independent of the GNSS-based navigator 140.

The graph 700 illustrates the processes of determining 260 a jump signature in a sequence of GNSS error estimates that was described herein with reference to FIGS. 2 and 4. The mode of the example GNSS error estimates is 4 meters during a GNSS error history length 710 immediately preceding the GNSS error process-based determination 740 of the jump signature. The inset 730 illustrates that in this example the GNSS error exceeds a threshold of four times the mode and causes a GNSS error process-based jump signature determination 740 at approximately 166.6 minutes. For comparison, a descent rate-based determination 750 that a jump signature is present in a sequence of filtered descent rates occurs approximately 0.3 minutes later, at approximately 166.9 minutes. GNSS error process-based jump signature determination 740 and the corresponding descent rate-based determination 750 on the basis of filtered descent rate both occur between the true start time 720 and the true finish time 760 of the parachute jump.

Figure 8:
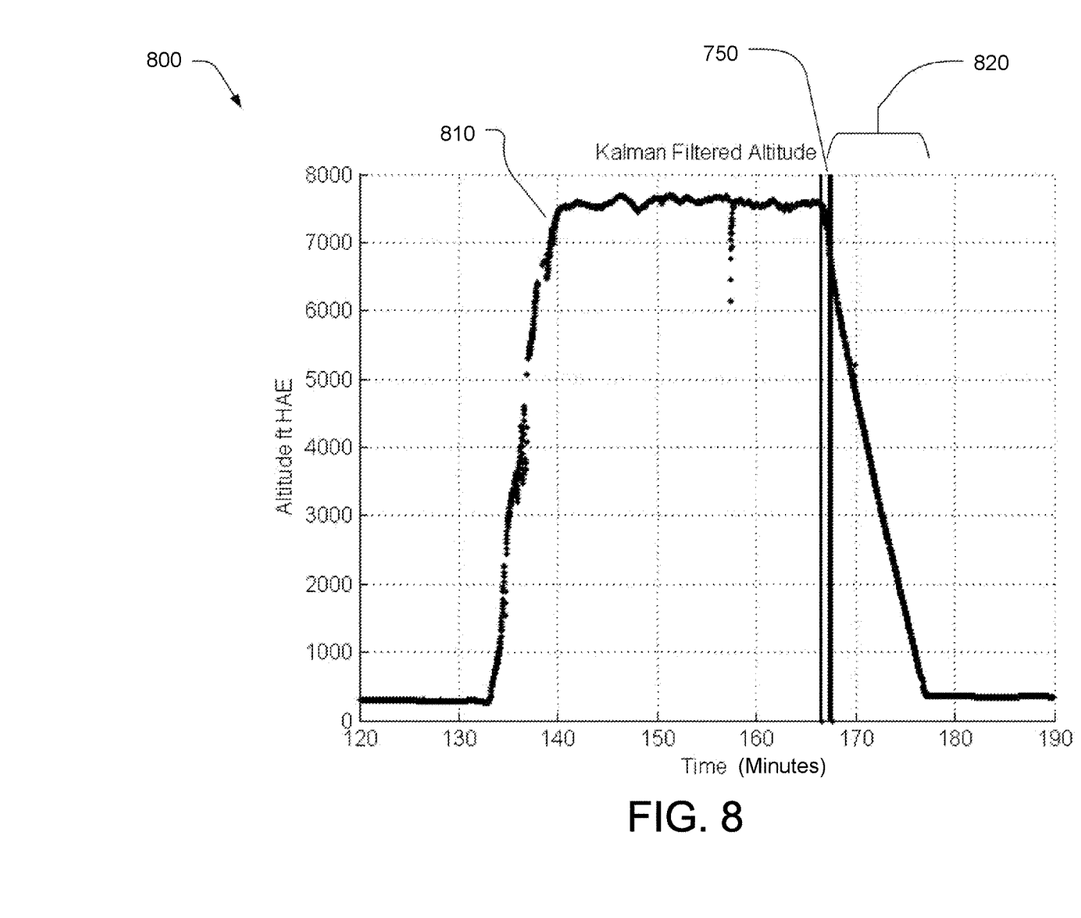
FIG. 8 shows a plot of the filtered altitude as a function of time for the parachute jump event depicted in FIG. 7.

Referring to FIG. 8, the graph 800 shows the filtered altitude 810 in meters above a World Geodetic System ellipsoid as a function of time in minutes, for the parachute jump event depicted in FIG. 7. The graph 800 illustrates an example process for determining 270 that a sequence of filtered descent rates contains a signature of a jump transition, which was described herein with reference to FIG. 2. The linear descent segment 820 of the filtered altitude shows a substantially constant descent rate of approximately 3.3 meters per second. Because the descent rate during the descent segment 820 exceeds an example threshold of 2.44 meters per second, a jump transition signature is determined 750 to have occurred early in the segment 820.

Figure 9:
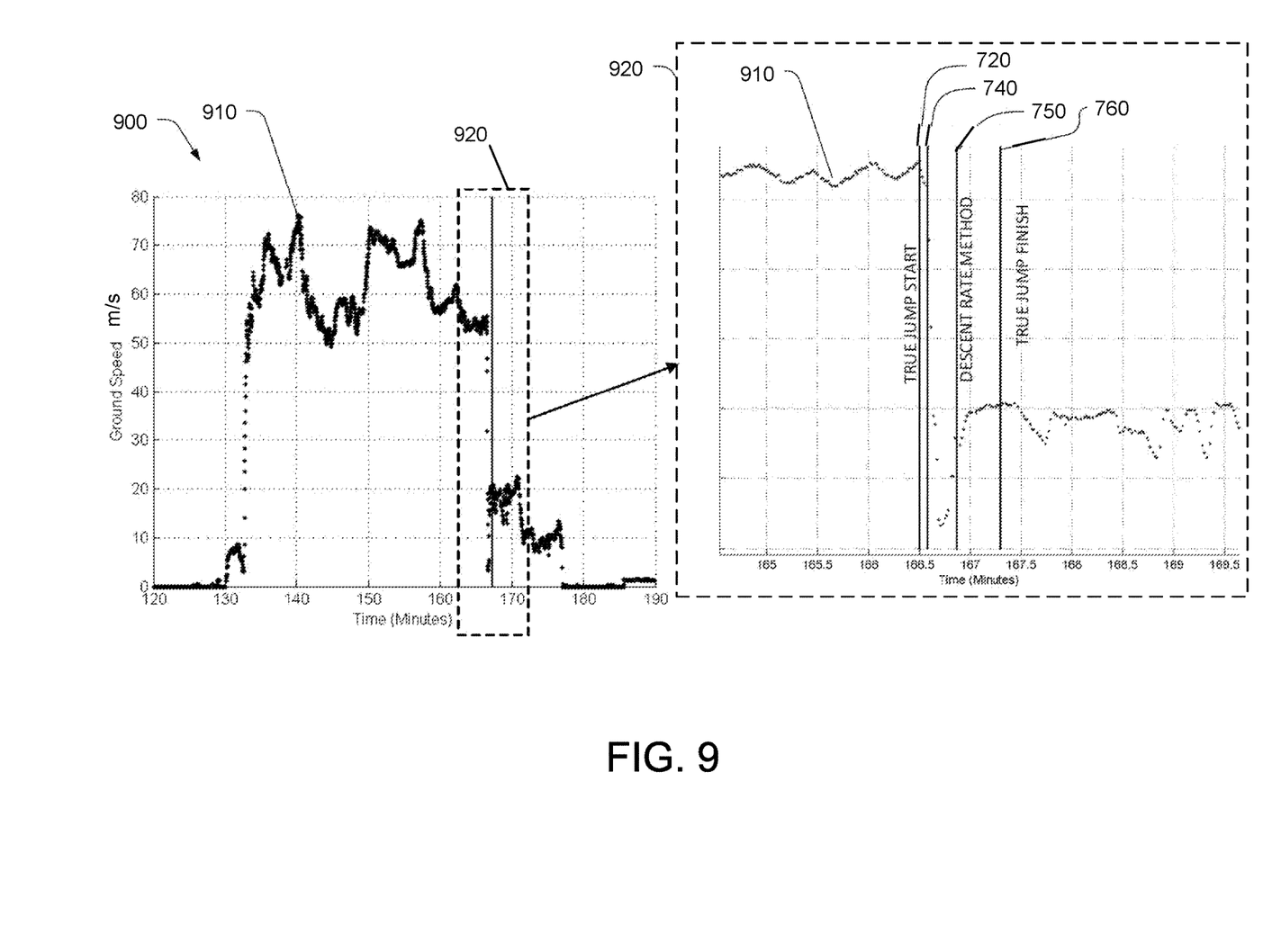
FIG. 9 shows a plot of the user's ground speed as a function of time for the parachute jump event depicted in FIG. 7.

Referring to FIG. 9, the graph 900 shows the user's ground speed 910, in meters per second (m/s), as a function of time in minutes, for the parachute jump event depicted in FIG. 7. The graph 900 illustrates the example process for determining 280 that the user has decelerated, which was described herein with reference to FIG. 2. The expanded portion 920 of the graph 900 shows that before the true start time 720 of the jump, the ground speed 910 exceeds the threshold of 50 meters per second. Shortly after the true start time 720 of the jump, atmospheric drag causes the user to decelerate almost to 0 meters per second, and thereafter the user's ground speed remains well below 50 meters per second. In this example, referring to the example process depicted in FIG. 2, jump signature determination 260 process (on the basis of GNSS error) or the corresponding determination 270 process (on the basis of filtered descent rate) would result in a jump transition indication 290.

Figure 10:
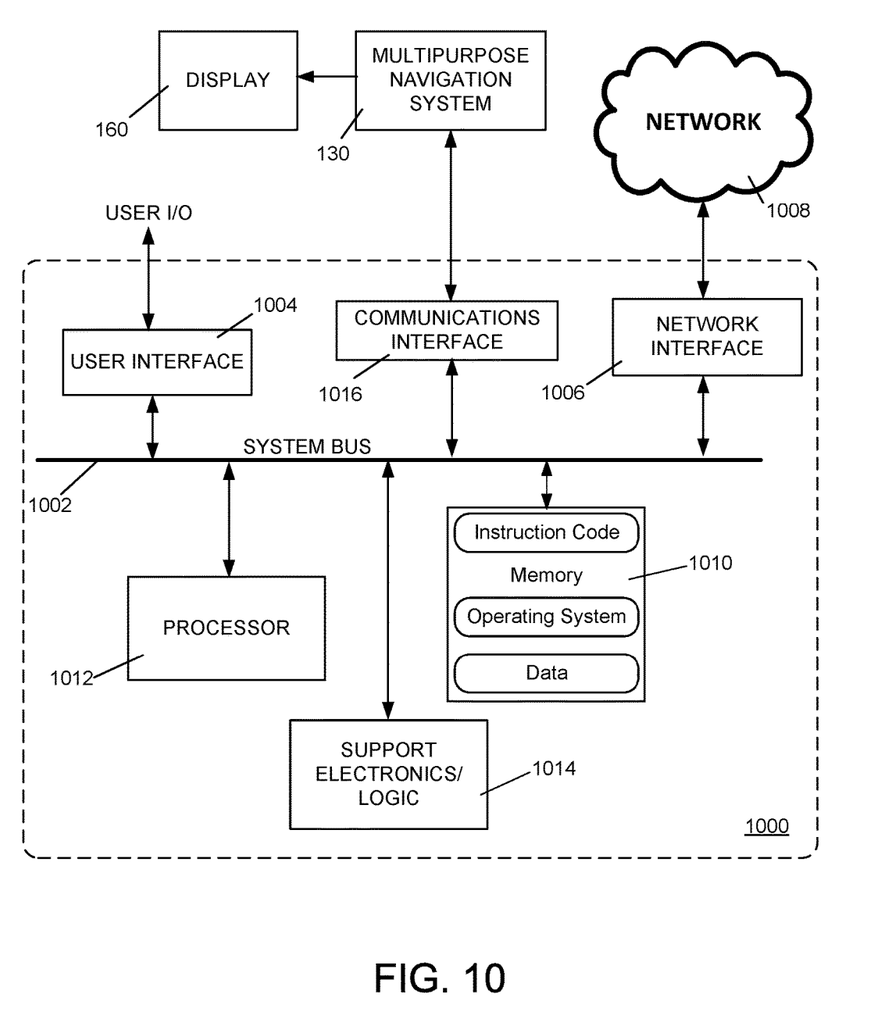
FIG. 10 shows an example processing system that may be used to implement one or more of the embodiments of the invention described herein.

FIG. 10 shows an example processing system 1000 that may be used to implement one or more of the embodiments herein. Each processing system 1000 contains a system bus 1002, where a bus is a set of hardware lines used for data transfer among the components of a computer or processing system. The system bus 1002 is essentially a shared conduit that connects different components of a processing system (e.g., processor, disk storage, memory, input/output ports, network ports, etc.) that enables the transfer of information between the components.

Attached to the system bus 1002 is a user I/O device interface 1004 for connecting various input and output devices (e.g., keyboard, mouse, displays, printers, speakers, etc.) to the processing system 1000. A network interface 1006 allows the computer to connect to various other devices attached to a network 1008. Memory 1010 provides volatile and non-volatile storage for information such as computer software instructions used to implement one or more of the embodiments of the present invention described herein, for data generated internally and for data received from sources external to the processing system 1000.

A central processor unit 1012 is also attached to the system bus 1002 and provides for the execution of computer instructions stored in memory 1010. The system may also include support electronics/logic 1014, and a communications interface 1016. The communications interface may comprise the navigation system interface 120 described with reference to FIG. 1.

In one embodiment, the information stored in memory 1010 may comprise a computer program product, such that the memory 1010 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

Embodiments or aspects of the present invention may be implemented in the form of hardware, software, or firmware. If implemented in software, the software may be any form of software capable of performing operations consistent with the example embodiments disclosed herein. The software may be stored in any non-transitory computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include (but not limited to), for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A method of identifying operational modes experienced by a user during a jump from an aircraft, comprising:
    estimating, by a navigator device, a user altitude and a user descent rate, based on a set of navigation state data vectors sampled according to a sampling interval;
    determining, by a computer-based jump determination module, that the user is ready to transition from a flight mode to a descent mode, but not yet in decent mode, when:
        the user altitude is above a jump altitude threshold, the jump altitude threshold being an altitude below which a jump should not be attempted; and
        a variation of the user altitude is below a predetermined altitude variation threshold;
    after determining that the user is ready to transition from the flight mode to the descent mode, determining, by the computer-based jump determination module, that the user has transitioned from a flight mode to a descent mode when:
        a user ground speed is below a ground speed threshold; and
        one or both of (i) a GNSS position error estimate, and (ii) the user descent rate estimate, indicates a jump signature; and
    receiving, by a multipurpose navigation system, information transmitted from the computer-based jump determination module about the transition from the flight mode to the descent mode, and changing a display presented by a display device associated with the multipurpose navigation system based on the information.

2. The method of claim 1, wherein the set of samples of navigation data comprises one or more of current raw altitude, ground speed measurements and GNSS position error estimate.

3. The method of claim 2, wherein estimating a user altitude comprises applying a Kalman filter to a set of samples of the current raw altitude.

4. The method of claim 2, wherein estimating a user descent rate comprises applying a Kalman filter to a set of user altitude changes, wherein each user altitude change is a change measured between consecutive raw altitude samples.

5. The method of claim 1, wherein determining the variation of the user altitude comprises determining a difference between (i) a current filtered altitude, and (ii) a minimum filtered altitude observed during a leveling test duration.

6. The method of claim 1, wherein determining the variation of the user altitude comprises first determining that the user altitude is above the jump altitude threshold, then determining that an absolute value of a difference between (i) a current filtered altitude and (ii) a greatest filtered altitude measured during a leveling test duration.

7. The method of claim 1, wherein determining the user ground speed comprises calculating a ground distance $D_g$ between consecutive position measurements from the set of navigational state data, and calculating a ratio of $(D_g)/$(sampling interval).

8. The method of claim 1, wherein the GNSS position error estimate indicates the jump signature when a first set of samples of the GNSS position error estimate exhibits a higher GNSS position error than a second set of samples of the GNSS position error estimate, the first set of samples occurring later in time than the second set of samples.

9. The method of claim 1, wherein the GNSS position error estimate indicates the jump signature when one or more samples of a first set of samples of the GNSS position error estimate exceeds a threshold value.

10. The method of claim 9, further including calculating the threshold value as a function of a second set of samples, the first set of samples occurring later in time than the second set of samples.

11. The method of claim 1, wherein the user descent rate estimate indicates the jump signature when each of a set of consecutive user descent rate estimate samples exceeds a descent rate threshold.

12. The method of claim 1, further including indicating that the user has transitioned from a descent mode to a landed mode when:
- the user altitude is below a landed mode altitude threshold;
- a user ground speed is below a landed ground speed threshold; and
- one or both of (i) a GNSS position error estimate, and (ii) the user descent rate, indicates the landed mode signature.

* * * * *

UNITED STATES PATENT AND TRADEMARK OFFICE
CERTIFICATE OF CORRECTION

| | | |
|---|---|---|
| PATENT NO. | : 10,378,903 B2 | Page 1 of 1 |
| APPLICATION NO. | : 15/417798 | |
| DATED | : August 13, 2019 | |
| INVENTOR(S) | : Sabrina M. Mansur and Trevor C. Savage | |

It is certified that error appears in the above-identified patent and that said Letters Patent is hereby corrected as shown below:

On the Title Page

Item (54) and in the Specification, Column 1 Lines 1-2 delete "Automatic Mode Control for a Parachutist Navigation System" and insert --Automatic Mode Control of a Parachutist Navigation System--

In the Attorney, Agent, or Firm item (74), delete "Hamilton, Brook, Smith & Reynolsd, P.C." and insert --Hamilton, Brook, Smith & Reynolds, P.C.--

Signed and Sealed this
Fifth Day of November, 2019

Andrei Iancu
*Director of the United States Patent and Trademark Office*